United States Patent Office 2,797,218
Patented June 25, 1957

2,797,218
CINNOLINE DERIVATIVES

Harry James Barber, Gidea Park, Kenneth Douglas Roland Washbourn, Ilford, and William Robert Wragg, Woodford Green, England, assignors to May & Baker Limited, Dagenham, England, a British company No Drawing. Application August 2, 1954,
Serial No. 447,432

Claims priority, application Great Britain August 13, 1953

4 Claims. (Cl. 260—250)

This invention is for improvements in or relating to cinnoline derivatives and is particularly concerned with the production of 4-hydroxycinnoline-3-carboxylic acids and of 4-hydroxycinnolines, which cinnoline derivatives may be substituted in the benzene ring by, for example, one or more atoms or groups selected from halogen, alkyl, aryl, alkoxy, aryloxy, alkylsulphonyloxy, arylsulphonyloxy groups and groups convertible into amino groups, including nitro groups. These cinnoline derivatives are useful intermediates in organic synthesis and particularly in the production of substances of therapeutic value such as the trypanocidal 6-pyrimidylaminocinnolines described in British patent specification Nos. 663,095 and 663,096 and $N^1$-$N^3$-bis(4'-amino-cinnolyl-6')guanidines described in British patent specification No. 702,664.

The methods generally employed hitherto for the production of compounds of this type have been reviewed by N. J. Leonard (Chem. Revs. 1945, 37, 269) and the investigation of further methods has subsequently been described by the same author (Leonard et al., J. Org. Chem., 1947, 12, 47).

These various methods suffer from disadvantages and limitations due inter alia to their involving the use as intermediates of 1:2-di-substituted benzene derivatives which, if substituents are required in the benzene ring of the desired cinnoline derivative, must also have such additional substituents in the appropriate positions before the cinnoline derivative is formed by a ring closure reaction. Such intermediates are normally relatively inaccessible and their preparation can involve difficult separations of isomers.

It is an object of this invention to provide a new and commercially advantageous process for preparing the aforesaid cinnoline derivatives. It is a further object to provide certain new and technically useful cinnoline derivatives obtainable by the aforesaid process.

The process of the present invention for the preparation of the said 4-hydroxycinnoline-3-carboxylic acids and 4-hydroxycinnolines comprises the ring closure of compounds represented by the conventional Formula I:

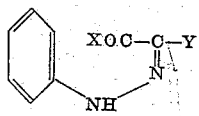

I wherein X represents an atom of chlorine or bromine, preferably the former, Y represents a carboxylic acid halide, a carboxylic acid ester or a cyano group or a hydrogen atom and the benzene ring may contain one or more substituents, so long as at least one of the positions ortho to the hydrazone group remains unsubstituted, and then, if necessary, converting the substances obtained by such ring closure into the desired products by hydrolysis, and where necessary decarboxylation.

The said compounds of Formula I are believed to have the structure shown but they may also exist in the tautomeric azo-form shown in Formula II.

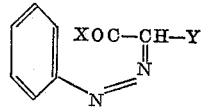

II

It is to be understood that when reference is made in this specification and in the appended claims to compounds of Formula I, this includes compounds of Formula II and mixtures of the two forms.

These intermediates are generally obtainable without difficulty in good yield from readily accessible materials and consequently the process of the invention has substantial advantages over the processes previously employed for preparing the cinnoline derivatives concerned.

When in general Formula I, Y represents a hydrogen atom the product of the ring-closure step is a 4-hydroxycinnoline. Where Y is other than hydrogen, the product of ring-closure depends upon the specific nature of Y but is convertible by hydrolysis into a 4-hydroxycinnoline-3-carboxylic acid. More specifically, when Y represents a carboxylic acid halide, carboxylic acid ester or cyano group, the application of normal methods for separation of a reaction product of the kind here in question will (where Y represents an acid halide group) and may (where Y represents an ester or cyano group) yield the carboxylic acid directly as hereinafter exemplified. Whether, therefore, when Y represents an ester or cyano group the ring closure step is followed by a separate stage of hydrolysis of the ester or cyano group to a carboxyl group (using standard hydrolysis conditions) depends upon the individual ring-closure products in question.

Of the various types of intermediate that may be employed as starting material, the di-acid halides, and particularly the di-acid chlorides of Formula I wherein X represents a chlorine atom and Y an acid chloride group, are particularly accessible and cheaply prepared and, therefore, constitute preferred starting materials both for the 4-hydroxycinnoline-3-carboxylic acids and the 4-hydroxycinnolines conveniently obtainable from these acids by decarboxylation.

The ring-closure step of the present invention is preferably effected by treating compounds of the general Formula I with an anhydrous inorganic halide catalyst of the type employed in the Friedel-Crafts reaction in a solvent medium inert to the reactants. The applicants' research and experimentation has shown that the catalysts of the said type are not all equally effective and that the yields obtained vary with the catalyst and with the intermediate concerned. Nevertheless, it has been found that metal halide catalysts selected from the group consisting of titanium tetrachloride, stannic chloride, antimony pentachloride, ferric chloride and aluminium trichloride are most generally effective and that of these titanium tetrachloride and stannic chloride are to be preferred. The preferred solvent medium is nitrobenzene but other inert solvents such as chlorobenzene, ethylene dichloride and tetrachloroethane may also be used in some cases with advantage.

The optimum reaction temperature also varies according to the reactants employed and may readily be determined for each individual case. It has been found that this optimum temperature is generally in the region of 80°–120° C.

The 4-hydroxycinnoline-3-carboxylic acids and the corresponding 4-hydroxycinnolines prepared according to this invention may be isolated from catalyst-containing reaction mixtures by conventional methods but when a steam-volatile reaction medium has been employed, this may, according to an additional feature of the invention, be removed by steam-distillation since this procedure has the advantage that it simplifies the separation of the product from the inorganic catalyst. When Y in the starting material is an acid halide or ester group and the preferred catalyst, titanium tetrachloride, is used, the process of steam-distillation when carried out under acid conditions, converts the catalyst into an alkali-insoluble form, from which the required 4-hydroxycinnoline-3-carboxylic acid may be extracted with aqueous alkali and re-precipitated by the addition of excess acid. When the steam-distillation is carried out under alkaline conditions the titanium tetrachloride is again converted into an insoluble form which can be filtered off, leaving a solution from which the product may be precipitated by the addition of excess acid. In addition, the removal of the solvent by steam-distillation normally results in the 3-carboxylic acids being obtained directly from the ring-closure of the intermediate di-acid chlorides and ester-acid chlorides without the need for a separate stage of hydrolysis.

The decarboxylation of the 4-hydroxycinnoline-3-carboxylic acids to give the corresponding 4-hydroxycinnolines may readily be effected by heating the former to a temperature of 200°–215° C. in an inert solvent such as benzophenone.

The intermediate compounds of Formula I may readily be obtained from the corresponding acids which are easily prepared by methods previously known and described in the literature, for example from aniline or an appropriately substituted aniline by diazotising the said aniline and coupling the product with an appropriate functional derivative of malonic acid to yield a product which can then be converted to the desired intermediate.

For the preparation of the intermediates wherein Y represents a carboxylic acid halide group, the appropriate diazotised aniline is coupled with diethyl malonate and the resulting diethyl mesoxalate phenylhydrazone is hydrolysed in boiling ethanolic solution by adding gradually one equimolecular proportion of 2 N sodium hydroxide solution, keeping the mixture just alkaline to phenolphthalein. The sodium salt of the half hydrolysed ester may be isolated at this stage by cooling and filtering. The hydrolysis is completed by treating the half hydrolysed ester, preferably in situ, with excess alkali at a temperature below about 65° C. The mesoxalic acid phenylhydrazone is then isolated by treating the mixture with dilute acid and filtering off the precipitated product. It may then be converted to the di-acid chloride by treatment with phosphorus pentachloride or thionyl chloride in a dry non-hydroxylic solvent such as chloroform, benzene or nitrobenzene. The reaction is conveniently carried out on a steam bath, the solvent being selected to give a good yield of crystalline product on cooling.

The intermediates in which Y is a carboxylic acid ester group may be obtained by partial hydrolysis of the diethyl mesoxalate phenylhydrazones as described above, and then converting the resulting half acid half esters to the corresponding acid chlorides.

The intermediates in which Y is a cyano group may be obtained by coupling the appropriate diazotised anilines with ethyl cyano-acetate and then hydrolysing the ester group with aqueous alkali. The α-cyano glyoxylic acid phenylhydrazones thus produced are then converted to the corresponding acid chlorides by the methods hereinbefore described.

The intermediates in which Y is a hydrogen atom are best prepared by decarboxylation of the corresponding half hydrolysed mesoxalic ester phenylhydrazones obtained as hereinbefore described, followed by hydrolysis to the glyoxylic acid phenylhydrazones and subsequent conversion to the corresponding acid chlorides.

The intermediates of Formula I are preferably isolated before ring-closure but alternatively they may be prepared in a suitable solvent such as nitrobenzene and treated in situ with the catalyst, although this procedure generally leads to inferior yields.

The invention is illustrated by the following examples; the temperatures recorded are on the centigrade scale:

EXAMPLE I

Mesoxalyl chloride p-chlorophenylhydrazone (14 g.) was dissolved in dry nitrobenzene (85 ml.) and titanium tetrachloride (9.5 g.) added. The solution was heated on the steam bath under anhydrous conditions for 4½ hours and then poured into 2 N sodium hydroxide solution (250 ml.). The nitrobenzene was removed by steam distillation, and the insoluble titanium salts filtered off. The filtrate on acidification with concentrated hydrochloric acid (30 ml.) gave 6-chloro-4-hydroxycinnoline-3-carboxylic acid which crystallised from dimethylformamide in colourless needles, M. P. 267° (decomp.).

6-chloro-4-hydroxycinnoline-3-carboxylic acid was also prepared from mesoxalyl chloride p-chlorophenylhydrazone by a similar method using 1.1 molar proportions of each of the following anhydrous catalysts: stannic chloride, ferric chloride, antimony pentachloride and aluminium chloride.

A mixture of 6-chloro-4-hydroxycinnoline-3-carboxylic acid (4.7 g.) and benzophenone (25 g.) was heated at 205–215° until the evolution of carbon dioxide ceased (50 minutes). The cooled melt was extracted with ether (200 ml.) and the residue of crude 6-chloro-4-hydroxycinnoline crystallised from ethanol in fine buff needles, M. P. 296°.

Mesoxalyl chloride p-chlorophenylhydrazone was prepared as follows:

Concentrated hydrochloric acid (250 ml.) was carefully added to molten p-chloroaniline (127.5 g.). The white crystalline slurry of p-chloroaniline hydrochloride was cooled to 0° and mixed with crushed ice (1.5 k.). A solution of sodium nitrite (71 g.) in water (300 ml.) was added in one portion and the mixture was stirred vigorously for 10 minutes. Excess nitrous acid was decomposed by the addition of the sulphamic acid. The cold diazonium salt solution was added dropwise during 30 minutes to a well-stirred mixture of diethylmalonate (160 g.), ethanol (2 l.), anhydrous sodium acetate (140 g.) and water (400 ml.), the temperature being maintained at 0°. Stirring was continued for 5 hours and the temperature was allowed to rise to 20°. The suspended ethyl mesoxalate p-chlorophenylhydrazone was filtered off and crystallised from ethanol (1 l.) in fine yellow needles M. P. 76°. 2 N sodium hydroxide (16.5 ml.) was added dropwise during 7 minutes to a boiling solution of ethyl mesoxalate p-chlorophenylhydrazone (10 g.) in ethanol (16.5 ml.). On cooling the reaction mixture to room temperature, sodium ethyl mesoxalate p-chlorophenylhydrazone separated as a yellow solid. Water (41 ml.) and 2 N sodium hydroxide solution (41 ml.) were then added and the mixture stirred vigorously at room temperature for 3 hours to complete the second stage of the hydrolysis. The red solution obtained was acidified with 2 N hydrochloric acid (60 ml.). Mesoxalic acid p-chlorophenylhydrazone separated as a yellow solid which crystallised from acetic acid in yellow needles, M. P. 190° (decomp.). To a suspension of mesoxalic acid p-chlorophenylhydrazone (70 g.) in dry nitrobenzene (400 ml.), phosphorus pentachloride (120 g.) was added. When the initial vigorous reaction had subsided the mixture was heated on the steam bath for 35 minutes. On cooling in ice mesoxalyl chloride p-chlorophenylhydrazone crystallised. This was filtered off, washed with dry petrol (B. P. 40–60°; 1 l.) and dried in vacuo over silica gel. The product was obtained as fine yellow needles, M. P. 156–157° (decomp.).

EXAMPLES II–XI

Further examples of 4-hydroxycinnoline-3-carboxylic acids and 4-hydroxycinnolines which have been prepared according to the present invention from the corresponding mesoxalyl chloride phenylhydrazones by a procedure similar to that described in Example I using either stannic chloride or titanium tetrachloride as catalyst, are given in Table I.

Table I
4-HYDROXYCINNOLINE-3-CARBOXYLIC ACIDS AND 4-HYDROXYCINNOLINES

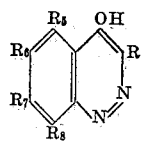

| Example | R5 | R6 | R7 | R8 | Catalyst | R=COOH M. P. (decomp.) °C. | R=H M. P., °C. |
|---|---|---|---|---|---|---|---|
| II | H | H | H | H | SnCl4 | 267–268 | 236–237 |
| III | H | CH3 | H | H | SnCl4 | 269 | 271 |
| IV | H | OMe | H | H | SnCl4 | 258–259 | |
| V | H | Br | H | H | TiCl4 | 257–258 | 277–278 |
| VI | Cl | H | H | Cl | TiCl4 | 248–249 | 222–224 |
| VII | H | H | Cl | Cl | TiCl4 | 249–250 | 261–262 |
| VIII | H | Cl | Cl | Cl | TiCl4 | 250–251 | |
| IX | H | Cl | H | Cl | TiCl4 | 247–248 | 198–199 |
| X | H | NO2 | H | H | TiCl4 | 275 | 336 |
| XI | H | H | H | OMe | TiCl4 | 274–275 | 162–163 |

EXAMPLE XII

Mesoxalyl chloride m-chlorophenylhydrazone was cyclised in a similar way using stannic chloride as catalyst to give 5 (or 7)-chloro-4-hydroxycinnoline-3-carboxylic acid, M. P. 263–264° (decomp.) which was decarboxylated to give 5 (or 7)-chloro-4-hydroxycinnoline, M. P. 330–332°.

EXAMPLE XIII

Mesoxalyl chloride 3-bromo-4-methylphenylhydrazone was cyclised similarly using stannic chloride as catalyst to give 5 (or 7)-bromo-4-hydroxy-6-methylcinnoline-3-carboxylic acid, M. P. 262–263° (decomp.), which was decarboxylated to give 5 (or 7)-bromo-4-hydroxy-6-methylcinnoline, M. P. 288–289°.

EXAMPLE XIV

Mesoxalyl chloride 3:4-dichlorophenylhydrazone was cyclised similarly using titanium tetrachloride as catalyst to give 5:6(or 6:7)-dichloro-4-hydroxycinnoline-3-carboxylic acid, M. P. 268° (decomp.), which was decarboxylated to give 5:6(or 6:7)-dichloro-4-hydroxycinnoline, M. P. 336–337°.

The melting points or boiling points of the intermediates used in Examples II to XIV inclusive are given in Table II.

Table II
INTERMEDIATES USED IN EXAMPLES II TO XIV

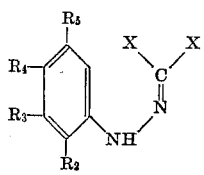

| Example | R2 | R3 | R4 | R5 | X—COOEt M. P., °C. | X—COOEt B. P., °C. | X—COOH M. P., °C. (dec.) | X—COCl M. P., °C. (dec.) |
|---|---|---|---|---|---|---|---|---|
| II | H | H | H | H | | 145–150/0.2mm. | 162–163 | 132–135. |
| III | H | H | CH3 | H | | 159–172/0.2 mm. | 165–167 | Not isolated. |
| IV | H | H | OMe | H | | 165–180/0.3 mm. | 142 | Do. |
| V | H | H | Br | H | 73 | | 192–194 | 158–160. |
| VI | Cl | H | H | Cl | 92 | | 210–212 | 111. |
| VII | Cl | Cl | H | H | 96–97 | | 199–200 | 104. |
| VIII | Cl | H | Cl | H | 92 | | 178 | 145–146. |
| IX | Cl | H | H | H | 76–77 | | 175–176 | 129–130. |
| X | H | H | NO2 | H | 79–82 | | 200–201 | 156. |
| XI | OMe | H | H | H | 56–57 | | 157 | 172–173. |
| XII | H | Cl | H | H | Not isolated | | 168 | Not isolated. |
| XIII | H | Br | CH3 | H | 73 | | 187 | Do. |
| XIV | H | Cl | Cl | H | 80–81 | | 185–186 | 149–150. |

EXAMPLE XV

A solution of ethyl hydrogen mesoxalate p-methylphenylhydrazone (25 g.) and pure thionyl chloride (13 g.) in dry benzene (700 ml.) was heated under reflux on the steam bath for 1 hour. Hydrogen chloride and sulphur dioxide were evolved. The solvent and excess thionyl chloride were removed in vacuo at 50° and the yellow residue of α-ethoxycarbonyl glyoxylylchloride p-methylphenylhydrazone dissolved in dry nitrobenzene (200 ml.). Cyclisation was effected by heating this solution with stannic chloride (27.4 g.) on the steam bath for 2 hours under anhydrous conditions. The hot mixture was poured into 2 N sodium hydroxide (760 ml.). The nitrobenzene was removed by steam distillation and the residue filtered hot. On acidification of the filtrate with concentrated hydrochloric acid 4-hydroxy-6-methylcinnoline-3-carboxylic acid separated as a brown solid which crystallised from acetic acid in buff needles, M. P. 265–266° (decomp.).

Ethyl hydrogen mesoxalate p-methylphenylhydrazone was prepared as follows:

Concentrated hydrochloric acid (250 ml.) was carefully added to molten p-toluidine (107 g.). The crystalline slurry of p-toluidine hydrochloride was cooled to 0° and mixed with crushed ice (1 kg.) A solution of sodium nitrite (71 g.) in water (300 ml.) was added rapidly and the mixture was stirred vigorously for 10 minutes. Excess nitrous acid was decomposed by the addition of sulphamic acid. The cold diazonium salt solution was added dropwise during 15 minutes to a well-stirred mixture of diethylmalonate (160 g.), ethanol (2 l.), anhydrous sodium acetate (140 g.) and water (400 ml.), the temperature being maintained at 0°. Stirring was continued for 12 hours, the temperature being allowed to rise to 20°. The aqueous ethanolic solution was siphoned off from the red oil which had separated. This solution was evaporated in vacuo to 1.2 l. and then diluted with water (3 l.), when the remaining crude product separated as a red oil. This was dissolved together with the previous crop of red oil in ether. The solution was washed with water and dried over anhydrous sodium sulphate. Removal of the solvent and high vacuum distillation of the residue gave ethyl mesoxalate p-methylphenylhydrazone as a pale yellow oil, B. P. 159–172°/0.2 mm.

2 N sodium hydroxide (280 ml.) was added dropwise during 30 minutes to a solution of ethyl mesoxalate p-methylphenylhydrazone (150 g.) in boiling ethanol (280 ml.), the solution being kept just alkaline to phenolphthalein throughout. The clear red solution obtained was heated for a further 10 minutes and then acidified with a mixture of 2 N hydrochloric acid (300 ml.) and water (1 l.). Ethyl hydrogen mesoxalate p-methylphenylhydrazone separated as a yellow solid which crystallised from ethanol (600 ml.) in fine yellow needles, M. P. 141° (decomp.).

We claim:
1. Process for preparation of compounds represented by the basic structural formula:

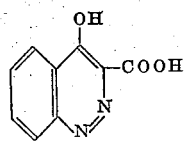

that comprises heating, in an inert solvent medium and in the presence of a catalyst of the type employed in the Friedel-Crafts reaction, a compound represented in one of its tautomeric forms by the basic structural formula:

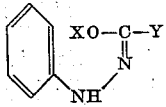

wherein X is chosen from the group consisting of bromine and chlorine, and Y is selected from the group consisting of carboxylic acid halide radicals and carboxylic acid ester radicals; recovering the reaction product from the reaction mixture and hydrolyzing said reaction product to convert said group Y to a carboxy group.

2. Process as defined in claim 1 wherein the catalyst is a substance chosen from the group consisting of titanium tetrachloride, stannic chloride, antimony pentachloride, ferric chloride, and aluminum trichloride.

3. Process as defined in claim 2 wherein the reaction mixture is heated at a temperature within the range of 80° to 120° C.

4. Process as defined in claim 3 wherein the inert solvent medium is nitrobenzene.

References Cited in the file of this patent

Leonard: Chem. Rev. 37, 270 (1945).
Simpson et al.: J. Chem. Soc. 1946, 1035–1036.
Schofield et al.: J. Chem. Soc. 1949, 2393–99.